May 21, 1946.　　　A. ZUSCHLAG　　　2,400,800
DETACHABLE HANDLE
Filed May 19, 1944

Adam Zuschlag INVENTOR.

BY
Victor J. Evans & Co.
ATTORNEYS

Patented May 21, 1946

2,400,800

UNITED STATES PATENT OFFICE 2,400,800

DETACHABLE HANDLE

Adam Zuschlag, Transfer, Pa.

Application May 19, 1944, Serial No. 536,311

1 Claim. (Cl. 294—31)

The invention relates to a handle, and more particularly to a detachable handle and utensil lifter.

The primary object of the invention is the provision of a handle of this character, wherein a cooking utensil or the like can be lifted and carried from one point to another with ease, and without liability of becoming burned, if the utensil be hot, or possible spilling of the contents thereof.

Another object of the invention is the provision of a handle of this character, wherein the construction thereof enables its use on different types and sizes of utensils, and is detachable, so that but a single handle is required for use with a number of cooking utensils.

A further object of the invention is the provision of a handle of this character, wherein the same is made adjustable for the proper fitting thereof to a utensil, the adjustment being had in a novel manner and with dispatch without the use of a tool.

A still further object of the invention is the provision of a handle of this character, which is simple in construction, thoroughly reliable and efficient in operation, strong, durable, readily and easily applied and removed, possessed of few parts, which are accessible for cleaning purposes, particularly adaptable to cooking utensils, although it may be used for other articles, and inexpensive to manufacture.

With these and other objects in view, the invention consists in the features of construction, combination and arrangement of parts as will be hereinafter more fully described, illustrated in the accompanying drawing, which shows the preferred embodiment of the invention, and pointed out in the claim hereunto appended.

In the accompanying drawing.

Similar reference characters indicate corresponding parts throughout the several views in the drawing.

Figure 1:
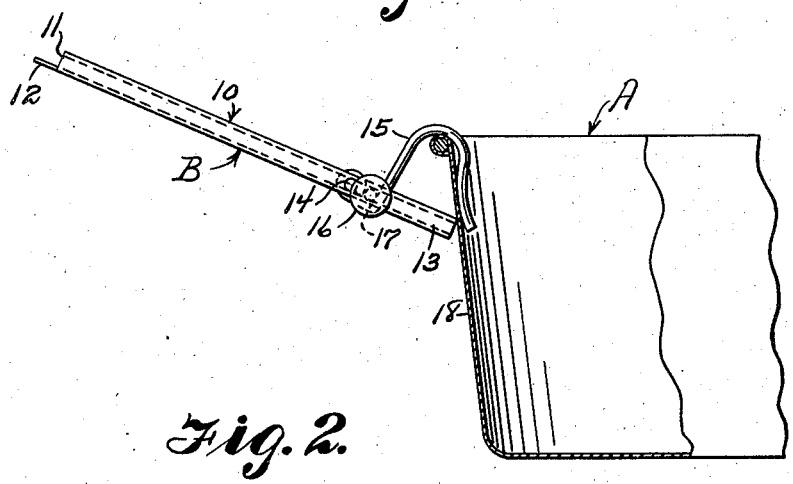
Figure 1 is a side view, partly broken away, of a cooking utensil, showing the handle constructed in accordance with the invention applied thereto.

Referring to the drawing, A designates generally a portion of a cooking utensil, of the saucepan type, while B denotes the detachable handle constructed in accordance with the invention and hereinafter set forth in detail.

The handle B comprises a channeled handle body-part 10, preferably made from a metal blank of elongated formation, having opposed longitudinally directed inbent side flanges 11 co-extensive therewith, the intermediate web portion 12 of this part 10 being arched outwardly from the flanges 11, and at one end of this part the web 12 is cut away for a distance, to provide a fork having abutment prongs 13 for engaging the side wall of the utensil A on the attachment of the handle thereto.

Figure 2:
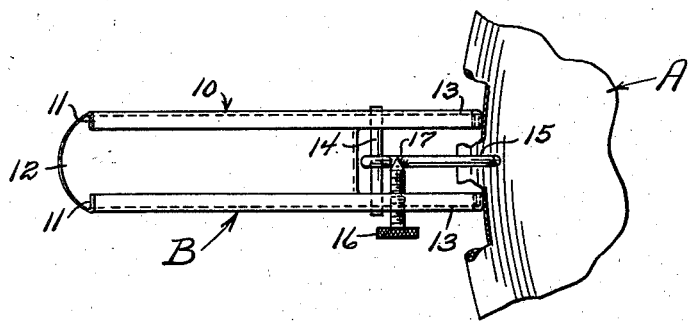
Figure 2 is a fragmentary top plan view, partly broken away.
Figure 3:
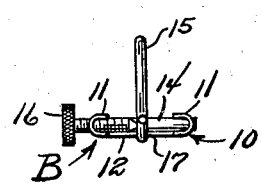
Figure 3 is a detail end view of the latching hook and adjuncts.

The prongs 13 are formed with oppositely aligned openings or holes, these may be in pairs spaced apart, for selectively receiving a cross-pivot 14 of a swinging latch hook 15, which is located centrally with respect to the fork, and is engageable over the rim-edge of the utensil, when the handle is disposed relative therto, as shown in Figures 1 and 2 of the drawing. In this manner, the utensil can be lifted and carried by the handle. The holes or openings in their arrangement allows adjustment of the hook 15 in the fork of the handle.

Tapped in one side of the fork of the handle part 10 is a threaded locking screw 16 which is engageable with an elbow 17 created in the hook 15 near its pivoted end, so that this hook when engaged with the side wall 18 of the pan, it will be firmly and securely held in such position to avoid accidental detachment of the handle from the utensil when lifting or carrying the same by such handle.

Disengaging the handle part from the utensil the hook 15 is lifted or swung from over the top edge of such pan, the screw being released therefrom for this purpose.

The handle by reason of its construction can be detachably engaged with different sizes of cooking utensils or the like, and is readily and easily applied to and removed from the same with dispatch, it being usable with a number of articles which have no handles, and such articles can be lifted and carried at will.

In applying the handle, the fork end thereof abuts the outer side of the wall of the utensil and the hook 15 engages over the top edge of such utensil A, and this hook is made fast in this position.

What is claimed is:

A handle of the kind described for detachably engaging an edge of a utensil, comprising a straight elongated handle body part having inwardly turned sides and a fork at one end forming abutment prongs, a cross pivot shaft received by said prongs, a hook for engaging over the edge of the utensil when the fork is engaged with the utensil and pivoted on the pivot shaft on the prongs of said fork, said hook having a right angular bend therein forward of said pivot, and manually operated means carried by the handle for holding the hook in engaging position, said means being positioned in said handle in parallel relationship with said cross pivot shaft.

ADAM ZUSCHLAG.